(12) United States Patent
Ishijima et al.

(10) Patent No.: US 7,862,121 B2
(45) Date of Patent: Jan. 4, 2011

(54) SEAT

(75) Inventors: Takahiro Ishijima, Aichi (JP); Yoichi Takada, Nisshin (JP)

(73) Assignees: Toyota Jidosha Kabushiki Kaisha, Toyota-shi, Aichi-ken (JP); Shiroki Corporation, Kanagawa (JP)

( * ) Notice: Subject to any disclaimer, the term of this patent is extended or adjusted under 35 U.S.C. 154(b) by 191 days.

(21) Appl. No.: 12/159,808

(22) PCT Filed: Jan. 25, 2007

(86) PCT No.: PCT/JP2007/051183

§ 371 (c)(1), (2), (4) Date: Jul. 1, 2008

(87) PCT Pub. No.: WO2007/086468

PCT Pub. Date: Aug. 2, 2007

(65) Prior Publication Data

US 2009/0289484 A1  Nov. 26, 2009

(30) Foreign Application Priority Data

Jan. 27, 2006  (JP) ............................. 2006-019291

(51) Int. Cl.
B60N 2/235  (2006.01)

(52) U.S. Cl. .................. 297/367 R; 297/378.1; 297/378.12

(58) Field of Classification Search ............ 297/378.12, 297/378.1, 367 R
See application file for complete search history.

(56) References Cited

U.S. PATENT DOCUMENTS 3,953,069 A  4/1976  Tamura et al.
3,957,312 A  5/1976  Bonnaud
3,958,828 A  5/1976  Ishida et al.

(Continued)

FOREIGN PATENT DOCUMENTS

DE  3319397  11/1984

(Continued)

OTHER PUBLICATIONS

European Search Report dated Jun. 22, 2009, for EP Appln. No. 07707415.

(Continued)

Primary Examiner—David Dunn
Assistant Examiner—Erika Garrett
(74) Attorney, Agent, or Firm—Finnegan, Henderson, Farabow, Garrett & Dunner, LLP

(57) ABSTRACT

A seat may be obtained with improved operability of plural adjustable units.

A vehicle seat 10 is provided with: a seat lifter 22 provided to a seat body that is for sitting on, and is adjusted by operation force transmitted from a first operating system; a reclining mechanism 20 provided to the seat body, that is adjusted by operation force transmitted from a second operating system; and an operation lever 30, imparting operation force for independently adjusting the reclining mechanism 20 and the seat lifter 22. The operation lever 30 imparts operation force to the seat lifter 22 when operated by rotation along the seat up-down direction in the direction of arrow D and arrow E, and imparts operation force to the reclining mechanism 20 when operated by rotation along the seat width direction in the direction of arrow F.

5 Claims, 9 Drawing Sheets

U.S. PATENT DOCUMENTS

| | | | |
|---|---|---|---|
| 4,146,267 A | 3/1979 | Mori et al. | |
| 4,437,703 A | 3/1984 | Nishikori et al. | |
| 4,461,511 A * | 7/1984 | Berneking et al. | 297/354.12 |
| 4,466,661 A | 8/1984 | Narita | |
| 4,580,838 A | 4/1986 | Schottker et al. | |
| 4,653,807 A | 3/1987 | Hirose et al. | |
| 4,700,989 A * | 10/1987 | Ercilla | 297/331 |
| 4,995,669 A | 2/1991 | Croft | |
| 5,393,116 A | 2/1995 | Bolsworth et al. | |
| 5,597,206 A * | 1/1997 | Ainsworth et al. | 297/378.12 |
| 5,611,599 A * | 3/1997 | Baloche et al. | 297/367 R |
| 5,700,055 A * | 12/1997 | Davidson et al. | 297/378.12 |
| 5,788,330 A | 8/1998 | Ryan | |
| 5,918,940 A * | 7/1999 | Wakamatsu et al. | 297/410 |
| 6,120,098 A | 9/2000 | Magyar et al. | |
| 6,402,249 B1 * | 6/2002 | Rohee et al. | 297/367 R |
| 6,619,744 B2 * | 9/2003 | Reubeuze | 297/378.12 |
| 6,663,180 B2 * | 12/2003 | LeTournoux | 297/378.12 |
| 7,293,838 B2 | 11/2007 | Sugama et al. | |
| 7,494,186 B2 | 2/2009 | Paing et al. | |
| 2009/0026825 A1 | 1/2009 | Ishijima et al. | |
| 2009/0058158 A1 | 3/2009 | Sobieski | |

FOREIGN PATENT DOCUMENTS

| | | |
|---|---|---|
| DE | 10015772 | 6/2001 |
| FR | 2770181 | 4/1999 |
| GB | 2 144 511 | 3/1985 |
| JP | 61-5976 | 1/1986 |
| JP | 63-36423 | 9/1988 |
| JP | 63-060404 | 11/1988 |
| JP | 2-36757 | 10/1990 |
| JP | 4-000854 | 1/1992 |
| JP | 8-26007 | 1/1996 |
| JP | 8-268128 | 10/1996 |
| JP | 2000-255295 | 9/2000 |
| JP | 2001-130294 | 5/2001 |

OTHER PUBLICATIONS

U.S. Appl. No. 12/161,856, filed Jul. 23, 2008; inventors: Takahiro Ishijima et al.

U.S. Appl. No. 12/161,873, filed Jul. 23, 2008; inventors: Takahiro Ishijima et al.

U.S. Appl. No. 12/161,361, filed Jul. 18, 2008; inventor: Katsuya Ueda.

* cited by examiner

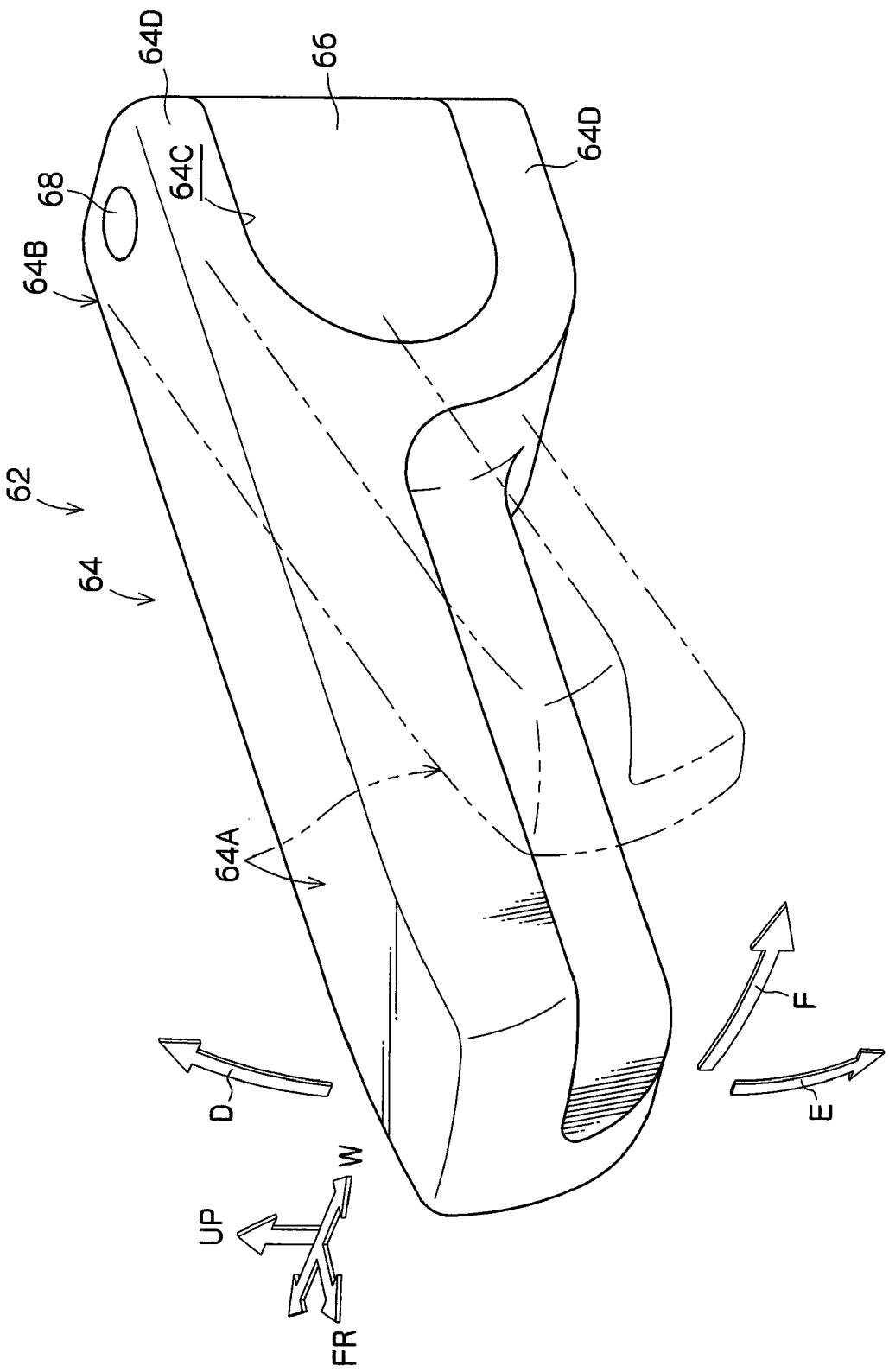

SEAT

CROSS-REFERENCE TO RELATED APPLICATIONS

This application is a national phase application of International Application No. PCT/JP2007/051183, filed Jan. 25, 2007, and claims the priority of Japanese Application No. 2006-019291, filed Jan. 27, 2006, the content of both of which is incorporated herein by reference.

TECHNICAL FIELD

The present invention relates to a seat such as, for example, a seat mounted to an automobile for an occupant to sit on.

RELATED ART

Vehicle seats are known that are provided with an operation lever for releasing the lock of a reclining mechanism and making the adjustment of the angle of a seat back possible, and a knob for adjusting the height of a seat cushion rear portion (see, for example, Japanese Patent Application Laid-Open (JP-A) No. 2001-130294, No. 2000-255295). As the operation lever and the knob, these are each disposed at a distance from each other at a seat width direction outside edge portion, and are able to be operated independently so that they do not interfere with each other.

Vehicle seats are also known that are configured with a reclining lever that is operable in two stages, at the first stage of operation the lock of a reclining mechanism is released and adjustment of the angle of the seat back is made possible, and at the second stage of operation the adjustment of the angle of the seat back remains possible but the seat is configured such that a height lever is engaged and the seat is raised (see, for example, JP-A No. H8-26007).

DISCLOSURE OF THE INVENTION

Problem to be Solved by the Invention

However, in the first of the above described technologies, since the operation lever and the knob are provided as separate items, it is difficult to dispose both of these in positions that have good operability. On the other hand in the second of the above described technologies, since the release of the lock of the height lock mechanism (operation of the height lever) cannot be carried out independently of the release of the reclining lock, this does not contribute to increased operability.

Consideration has been made of the above points and an object of the present invention is to provide a seat with that is able to improve the operability of plural adjustable units.

Method of Solving the Problem

A seat of a first aspect of the present invention includes: a first adjustable unit, provided to a seat body that is for sitting on, the first adjustable unit being adjusted by operation force transmitted from a first operating system; a second adjustable unit, provided to the seat body, the second adjustable unit being adjusted by operation force transmitted from a second operating system; and an operation force imparting member, imparting operation force to the first operating system by operation in a first predetermined direction and imparting operation force to the second operating system by operation in a second predetermined direction that is different from that of the first predetermined direction.

By the above aspect, when the operation force imparting member is operated in the first predetermined direction, the first adjustable unit is adjusted by this operation force, or the first adjustable unit is placed in a state in which it is adjustable (a lock released state or the like, for example). On the other hand, when the operation member is operated in the second predetermined direction, the second adjustable unit is adjusted by this operation force, or the second adjustable unit is placed in a state in which it is adjustable.

Thereby, two adjustable units may be independently adjusted by a single operation member. In doing so, in comparison to a configuration in which two operation members are provided for independent operation of two adjustable units, limitations are reduced for the placement and size of the operational region of a seat occupant, and an increase in the degrees of freedom for design may be achieved. Therefore, for example, by disposing the single operation member, which is capable of independently operating two adjustable units, in a position at the seat cushion that has good operability, both adjustable units may be operated with good operability.

In this manner, the seat of the above described aspect is able to improve the operability of plural adjustable units. It should be noted that there may be three or more adjustable units and the operation force imparting unit may be provided with the functionality of three or more operation force imparting units corresponding thereto.

In the above aspect, it is preferable that the operation force imparting member is disposed adjacent to the seat body at the seat width direction outside, and the first predetermined direction is along the seat up-down direction, and the second predetermined direction is along the seat width direction.

By the above aspect, the first predetermined direction along the seat up-down direction and the second predetermined direction along the seat width direction are both easily operated directions for the operation force imparting member that has been disposed to the seat body at the seat width direction outside, and there is with good operability.

In the above aspect, it is preferable that the rear end in the front-rear direction of the operation force imparting member is supported by the seat body so as to be rotatable about an axis that is along the seat width direction and also to be rotatable about an axis that is along the seat up-down direction; the first predetermined direction is a rotational direction, about an axis along the seat width direction, in which the front end side of the operation force imparting member is displaced either toward the top side or toward the bottom side in the seat up-down direction; and the second predetermined direction is a rotational direction, about an axis along the seat up-down direction, in which the front end side of the operation force imparting member is displaced in the seat width direction.

By the above aspect, when the front end side of the operation force imparting member is operated to the top side or to the bottom side, the operation force imparting member rotates about the axis along the seat width direction, and this operation force is transmitted to the first adjustable unit. On the other hand, when the front end side of the operation force imparting member is operated in the seat width direction (while there are seat width directions both toward the inside or toward the outside, it is the seat width direction toward the outside that is preferable), the operation force imparting member rotates about the axis along the seat up-down direction, and this operation force is transmitted to the second adjustable unit. Since the rear end side of the operation force imparting member is not displaced with respect to the seat body in the up-down direction, or the seat width direction, the configuration may be compact.

In the above aspect, it is preferable that the seat further includes a first double operation prevention mechanism that, in a state in which the operation force imparting member is being operated in the first predetermined direction, prevents operation force being transmitted from the operation force imparting member to the second adjustable unit.

By the above aspect, in the state in which the operation force imparting member is being operated in the first predetermined direction and the first adjustable unit is being adjusted, the first double operation prevention mechanism restricts, for example, displacement of the operation force imparting member to the second predetermined direction side, or disconnects the transmission path of operation force to the second adjustable unit (second operating system), and thereby prevents the transmission of operation force to the second adjustable unit (adjustment of the second adjustable unit). In this manner, in a configuration in which a single operation force imparting member is able to adjust two adjustable units, adjustment to the unintentional adjustable unit may be prevented from being carried out.

In the above aspect, it is preferable that the first double operation prevention mechanism includes an engaging portion, provided to the second predetermined direction side with respect to the operation force imparting member, and preventing, by engaging, displacement in the second predetermined direction of the operation force imparting member when it is operated to the first predetermined direction side.

By the above aspect, when the operation force imparting member that is being operated to the first predetermined direction side is operated toward the second predetermined direction side, the operation force imparting member engages with the engaging portion, and the operation itself in the second predetermined direction is prevented. In this manner a first double operation prevention mechanism may be realized with a simple structure.

In the above aspect, it is preferable that the engaging portion includes a wall portion that extends along the first predetermined direction and along the second predetermined direction, and there is a cutout portion formed to the wall portion, into which a portion-to-be-engaged of the operation force imparting member is intruded accompanying the operation of the operation force imparting member from the non-operation position toward the second predetermined direction.

By the above aspect, when the operation force imparting member that has been operated to the first predetermined direction side is operated in the second predetermined direction, the portion-to-be-engaged of the operation force imparting member engages with the engaging portion. However, when the operation force imparting member is positioned in the non-operation position and is then operated to the second predetermined direction side, the portion-to-be-engaged intrudes into the cutout portion and thereby permits displacement in the second predetermined direction, and operation force is transmitted to the second adjustable unit. In the operation state toward the second predetermined direction, by the positioning of the edge portions of the cutout portion that has been formed in the wall portion extending along the first predetermined direction and along the second predetermined direction, or in other words, by the positioning of the end face of the wall portion to the first predetermined direction relative to the portion-to-be-engaged, operation of the operation force imparting member toward the first predetermined direction is prevented by the engagement of the end face with the portion-to-be-engaged.

Therefore, in the present seat, in the state in which one of the adjustable units is being adjusted by the common operation force imparting member, adjustment of the other adjustable unit is prevented, and a seat occupant carrying out adjustment to the unintended adjustable unit is reliably prevented.

In the above aspect, it is preferable that the seat further includes a second double operation prevention mechanism that prevents movement of the operation force imparting member toward the first predetermined direction side in the state in which the operation force imparting member is being operated toward the second predetermined direction side.

By the above aspect, in the state in which the operation force imparting member is being operated toward the second predetermined direction and the second adjustable unit is being adjusted, the second double operation prevention mechanism restricts, for example, displacement of the operation force imparting member to the first predetermined direction side, or disconnects the transmission path of operation force to the first adjustable unit (first operating system), and thereby prevents the transmission of the operation force to the first adjustable unit (adjustment of the first adjustable unit). In this manner, in a configuration in which a single operation force imparting member is able to adjust two adjustable units, adjustment to the unintentional adjustable unit may be prevented from being carried out.

In the above aspect, it is preferable that the second double operation prevention mechanism includes an edge portion of a cutout portion, positioned to the second predetermined direction side with respect to the operation force imparting member and provided to a wall portion extending along the first predetermined direction and along the second predetermined direction, the cutout portion being intruded into by an engaging portion of the operation force imparting member accompanying the operation of the operation force imparting member from the non-operation position in the second predetermined direction.

By the above aspect, when the operation force imparting member is operated to the second predetermined direction side, the portion-to-be-engaged is intruded into the cutout portion provided to the wall portion extending along the first predetermined direction and along the second predetermined direction. If the operation force imparting member attempts to operate in the first predetermined direction from this state, the portion-to-be-engaged engages with the edge portion of the cutout portion in the wall portion, and prevents operation of the operation force imparting member toward the first predetermined direction. However, in the state in which the operation force imparting member positioned in the non-operation position has been operate in the first predetermined direction, if the operation force imparting member attempts to operate in the second predetermined direction, the wall portion positioned at the second predetermined direction side engages with the portion-to-be-engaged, thereby preventing operation of the operation force imparting member toward the second predetermined direction.

Therefore, in the present seat, in the state in which one of the adjustable units is being adjusted by the common operation force imparting member, adjustment of the other adjustable unit is prevented, and a seat occupant carrying out adjustment to the unintended adjustable unit is reliably prevented.

In the above aspect, it is preferable that the wall portion is formed to a cover member covering the first adjustable unit.

By the above aspect, by providing the wall portion to the cover member, a configuration is enabled with the first or the second double operation prevention mechanism, without increasing the number of components.

In the above aspect, it is preferable that the operation force imparting member is connected to the second adjustable unit through a cable of a covered cable so that operation force is transmittable; and a cover portion of the covered cable at the end portion on the operation force imparting member side, is fixed to a location that follows displacement of the operation force imparting member in the first predetermined direction but does not follow displacement in the second predetermined direction, and is of a length such that tension is not generated accompanying the displacement of the operation force imparting member to the first predetermined direction side.

By the above aspect, when the operation force imparting member is operated in the second predetermined direction, the cable is pulled so as to be pulled out from the fixed end of the cover portion of the covered cable at the operation force imparting member side, and operation force is transmitted to the second adjustable unit. However, when the operation force imparting member is operated in the first predetermined direction, since there is no tension acting on the cover portion accompanying this operation (operation up to the operation limit), the cover portion does not get in the way of displacement of the operation force imparting member toward the first predetermined direction. Furthermore, since no relative displacement is generated between the cable and the end portion of the cover portion at the operation force imparting member side by operation of the operation force imparting member in the first predetermined direction, there is also no tensile force generated in the cable accompanying the operation (operation up to the operation limit) of the operation force imparting member in the first predetermined direction, and therefore operation force is not transmitted to the second adjustable unit.

Thereby, in a configuration in which two adjustable units are adjustable by the common operation force imparting member, a seat occupant carrying out adjustment to the unintended adjustable unit is prevented.

In the above aspect, it is preferable that the first adjustable unit is a height adjusting mechanism for adjusting position of the seat body in the up-down direction; and the second adjustable unit is a reclining mechanism for switching between a state in which a seat back angle relative to a seat cushion is locked, and a lock released state thereof.

By the above aspect, since the reclining mechanism and the height adjusting mechanism may be operated by a common operation force imparting member, in comparison to a configuration in which two operation members are provided for independent operation thereof, there are few limitations to the placement and dimensions of the operation force imparting member. Therefore, by disposing the operation force imparting member in a position at the seat that has good operability for a seat occupant, good operability may be realized for both a height adjusting mechanism and for an angle adjusting mechanism.

Effect of the Invention

The seat according to the present invention as has been explained above, has the superior effect of being able to improve the operability of plural adjustable units.

BRIEF DESCRIPTION OF THE DRAWINGS

FIG. 7 is a perspective view showing an operation force imparting portion of a vehicle seat operation force imparting unit according to a second exemplary embodiment of the present invention;

BEST MODE OF IMPLEMENTING THE INVENTION

Explanation will now be given regarding the vehicle seat 10 as a seat according to a first exemplary embodiment of the present invention, with reference to FIGS. 1 to 6. It should be noted that in each of the figures the appropriately shown arrow FR, arrow UP and arrow W represent the front direction (direction of progression) of an automobile to which the vehicle seat 10 has been applied, the up direction thereof and the vehicle width direction, and these match the front direction, up direction and width direction of the vehicle seat 10. When reference is simply made below to the front-rear direction, up-down direction and width direction this indicates respective directions with reference to the above described vehicle seat (automobile).

Figure 4:
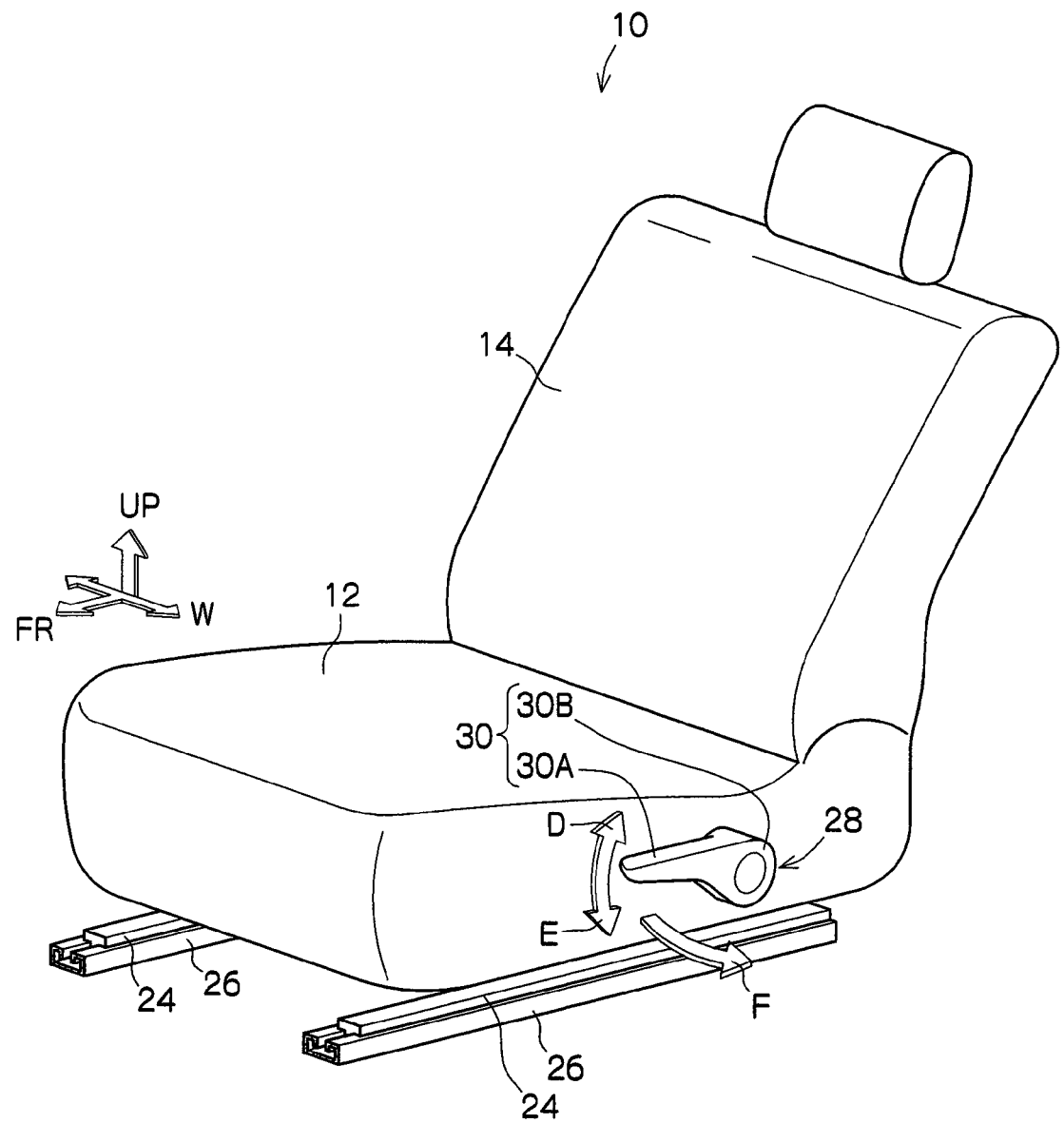
FIG. 4 is a perspective view showing the overall configuration of a vehicle seat according to the first exemplary embodiment of the present invention.
Figure 6:
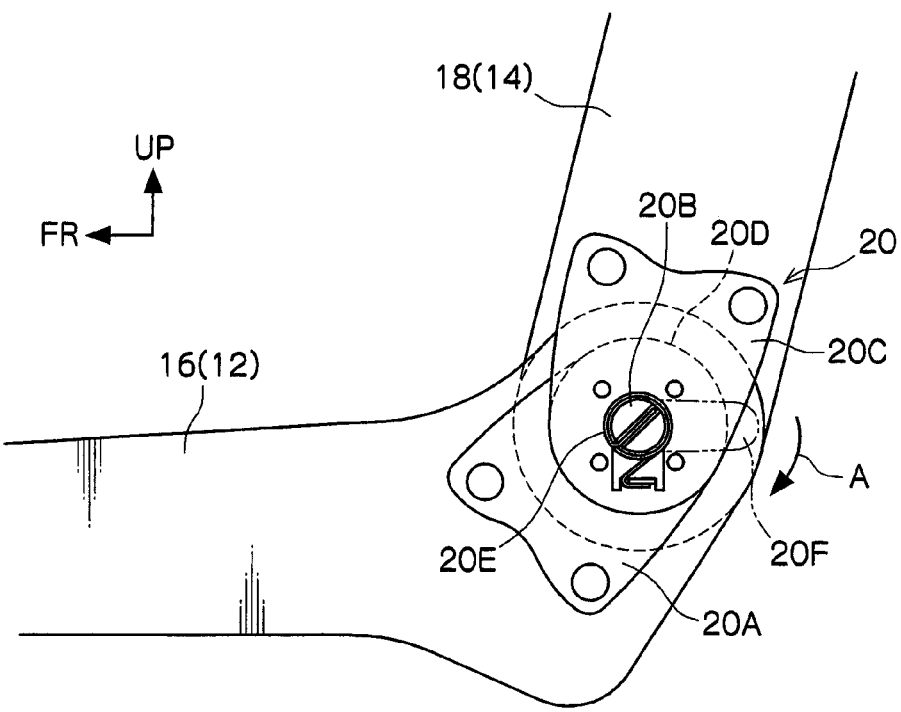
FIG. 6 is side view showing a reclining mechanism configuring a vehicle seat according to the first exemplary embodiment of the present invention.

FIG. 4 shows an outline of the overall configuration of the vehicle seat 10 in perspective view. As shown in the figure, the vehicle seat 10 is provided with a seat cushion 12 that is for an occupant sitting on and a seat back 14, supporting the upper body of a seated occupant from the rear. As shown in FIG. 6, the back edge portion of a seat cushion frame 16, configuring the seat cushion 12, and the bottom edge portion of a seat back frame 18, configuring the seat back 14, are connected together, in such a way that the relative angle therebetween may be adjusted, through reclining mechanisms 20 serving as angle adjusting mechanisms. There is a reclining mechanism 20 provided at both sides in the width direction, and the reclining mechanisms 20 are coupled together by a non illustrated interlocking mechanism.

As shown in FIG. 6, the reclining mechanism 20 is configured including main components of: a cushion side bracket 20A, which is fixed to the seat cushion frame 16; a back side bracket 20C, which is connected to the cushion side bracket 20A through a reclining shaft 20B and is also fixed to the seat back frame 18; a lock connecting portion 20D, which has the relative angle of the cushion side bracket 20A and the back side bracket 20C adjustable in plural stages, or continuously adjustable, about the reclining shaft 20B, and which may be locked at a desired angle; and a torsion spring 20E, which inhibits relative angular displacement between the cushion side bracket 20A and the back side bracket 20C, and biases the lock connecting portion 20D to the lock side. Also, the reclining mechanism 20 that is on one side in the seat width direction (on the vehicle width direction outside, for example) is provided with a lock release arm 20F that has been connected at one end in the length direction thereof to the reclining shaft 20B and is rotatable as one therewith. Since the lock connecting portion 20D may be obtained from various known structures, explanation of the structure thereof will be omitted.

This pair of reclining mechanisms 20 is configured so that, when the lock connecting portion 20D is in the locked state, a desired angle of inclination of the seat back 14 (seat back frame 18) with respect to the seat cushion 12 (seat cushion frame 16) is maintained. Furthermore, when in the pair of reclining mechanisms 20 the lock release arm 20F rotates in the direction of arrow A, as shown in FIG. 5, against the biasing force of the torsion spring 20E, then the respective lock connecting portions 20D are released from the locked state by the rotation directly, or by the rotation transmitted by the interlocking mechanism.

There is a non illustrated return spring disposed between the seat cushion 12 and the seat back 14, and when each of the reclining mechanisms 20 is in the lock released state, and there is no load on the seat back 14, then the seat back 14 tilts forward to a predetermined position relative to the seat cushion 12. However, when each of the reclining mechanisms 20 is in the lock released state and a load of a predetermined value or above acts toward the rear on the seat back 14, the seat back 14 tilts to the rear relative to the seat cushion 12. Also, when the operation force of the lock release arm 20F is released when the seat back 14 is at a desired angle of inclination relative to the seat cushion 12, the reclining mechanisms 20 return to the locked state due to the biasing force of the torsion spring 20E, and the seat back 14 is maintained at the desired angle of inclination relative to the seat cushion 12.

The lock release of the reclining mechanisms 20 is achieved by operation force, from an operation lever 30 taking up a recliner selected state being transmitted by a covered cable 46 as a second operation system (these will be described later) to the lock release arm 20F.

Figure 5:
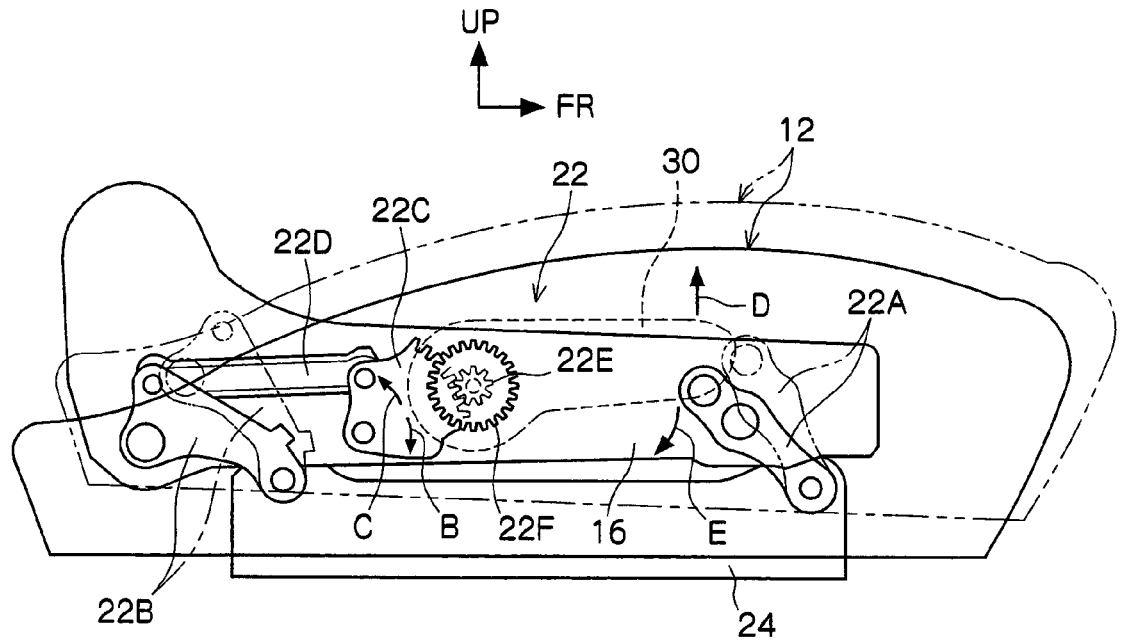
FIG. 5 is side view showing a seat lifter configuring a vehicle seat according to the first exemplary embodiment of the present invention.

The vehicle seat 10 is also provided with a seat lifter 22 like the one shown in FIG. 5, serving as a first adjustable unit. The seat lifter 22 is provided with a pair of front-rear links 22A, 22B that each have top and bottom ends thereof rotatably connected to an upper rail 24 and to the seat cushion frame 16, and the front-rear links 22A, 22B together with the upper rail 24 and the seat cushion frame 16 configure a quadric crank chain. The upper rail 24 is supported so as to be able to slide in the front-rear direction on lower rails 26 (see FIG. 4), which are fixed to the vehicle body floor.

The front-rear links 22A, 22B are disposed such that phantom lines connecting top and bottom connecting portions (rotational shafts) of each are substantially parallel to each other and are inclined down toward the rear, and it is configured such that, by changing the rearward angle of inclination, the seat cushion frame 16 may be moved in the up-down direction relative to the upper rail 24 and moved toward or away from the upper rail 24. It should be noted that in FIG. 5 the solid lines and the phantom lines show respectively the lower limit position and the upper limit position of the seat cushion frame 16 (seat cushion 12) relative to the upper rail 24.

There is also a lifter gear 22C provided to the seat lifter 22 and rotatably axially supported on the seat cushion frame 16, and a front end portion of a connecting link 22D is connected rotatably to the upper portion of a rotational shaft of the lifter gear 22C. The rear end portion of the connecting link 22D is connected rotatably to the upper part of the connecting portion of the link 22B with the seat cushion frame 16. Thereby, in the seat lifter 22, when the lifter gear 22C is rotated in the direction of arrow B, the link 22B rotates to the standing up direction side and the seat cushion frame 16 displaces upward, and when the lifter gear 22C is rotated in the opposite direction to that of arrow B, in the direction of arrow C, then the link 22B rotates to incline toward the rear and the seat cushion frame 16 displaces downward.

The seat lifter 22 is provided with a pinion 22E that is meshed with the lifter gear 22C, and the pinion 22E is connectable to an operation lever 30 serving as a first operation system, described later, through a pump lifter mechanism 22F. The pump lifter mechanism 22F is supported on the seat cushion frame 16, and the lifter gear 22C is rotated in the direction of arrow B, through the pinion 22E, by the rotation of the operation lever 30 in the direction of arrow D, and it is configured such that when the operation lever 30 is being returned from a rotational position on the arrow D side (referred to below as the upper side operation position) to a neutral position that is a non-operation position, operation force is not transmitted to the pinion 22E.

In the same manner, the pump lifter mechanism 22F rotates the lifter gear 22C in the direction of arrow C, through the pinion 22E, by the rotation of the operation lever 30 in the direction of arrow E, and it is configured such that when the operation lever 30 is being returned from a rotational position at the arrow E side (referred to below as the lower operation position) to a neutral position, operation force is not transmitted to the pinion 22E.

The pump lifter mechanism 22F also has a braking function such that the pinion 22E does not rotate in the reverse direction due to force from the lifter gear 22C side. It should be noted that there is a biasing member included in the pump lifter mechanism 22F that biases the operation lever 30 to toward the neutral position side, and there is no requirement for operation force to return the operation lever 30 to the neutral position.

By the above, the seat lifter 22 raises the seat cushion 12 relative to the vehicle body floor with a reciprocating swinging movement by rotation of the operation lever 30 between the neutral position and the rotational position on the arrow D side, and the seat lifter 22 lowers the seat cushion 12 relative to the vehicle body floor with a reciprocating swinging movement by rotation of the operation lever 30 between the neutral position and the rotational position on the direction of arrow E side. Also, the seat cushion 12 may be maintained at a desired height against a seating load.

As shown in FIG. 4, at a edge portion of the seat cushion 12 in the seat width direction (at the vehicle width direction outside, for example) there is disposed an operation force imparting unit 28, for adjusting the reclining angle of the vehicle seat 10 and the height relative to the floor thereof. The operation force imparting unit 28 is provided with the operation lever 30 as a single operation member for operating independently the reclining mechanism 20 and the seat lifter 22. In the present exemplary embodiment the operation force imparting unit 28 is disposed to an operable side portion of the seat cushion 12.

Figure 1A:
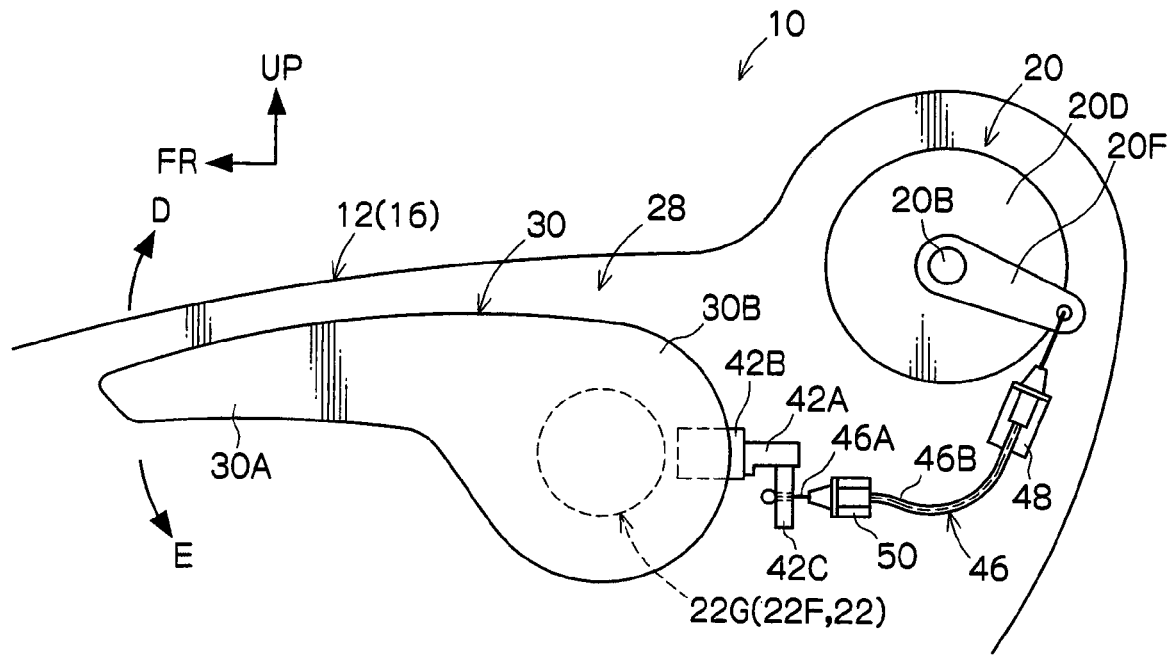
FIG. 1A is a side view of an operation force imparting unit of a vehicle seat according to a first exemplary embodiment of the present invention.
Figure 1B:
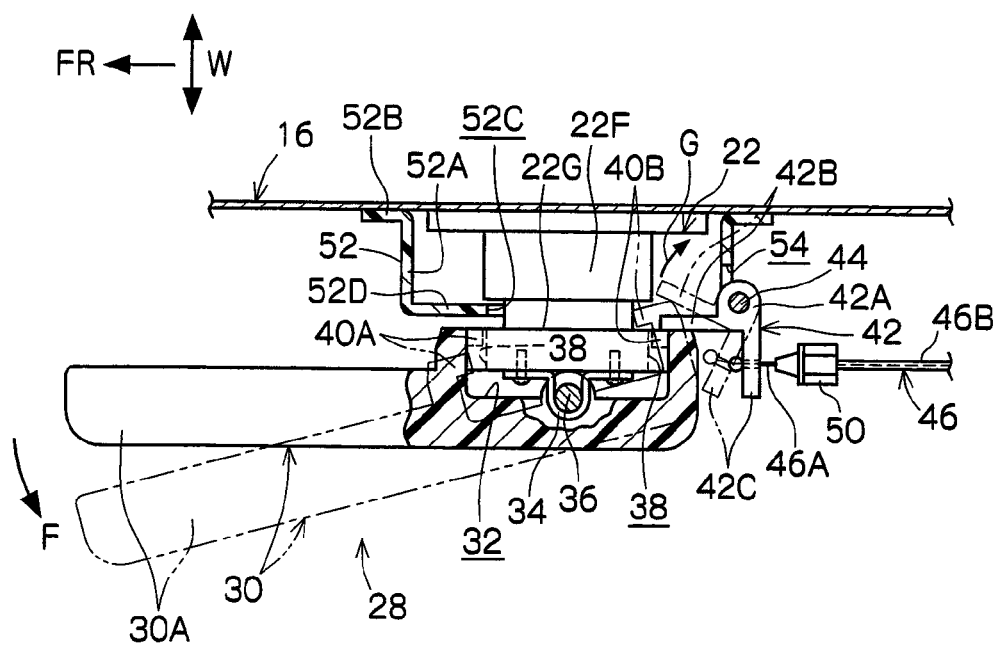
FIG. 1B is a plan view cross-section of an operation force imparting unit of a vehicle seat according to a first exemplary embodiment of the present invention

As shown in FIG. 1A, the operation lever 30 is long in the front-rear direction, and the front end thereof is an operation portion 30A, and the rear end side thereof is a load transmission portion 30B. The operation portion 30A is formed into a shape that is easily griped by a person. As shown in FIG. 1B, there is a circular columnar shaped space of a recess portion 32, formed in the load transmission portion 30B and open to the inside in the width direction.

An operation load input portion 22G of the seat lifter 22 (pump lifter mechanism 22F) is inserted internally into the recess portion 32 in the load transmission portion 30B. A reclining operation shaft 36 with an axis along the up-down direction is supported, through a bracket 34, at the outside face in the width direction of the operation load input portion 22G so as to be able to rotate about its own axis. The top and bottom ends 36A of the reclining operation shaft 36 that protrude out from the bracket 34 are each fixed inside the recess portion 32 of the load transmission portion 30B by screws or the like. There is a gap set between the load transmission portion 30B and the operation load input portion 22G, which allows rotation of the operation lever 30 about the reclining operation shaft 36 by a predetermined angle.

Figure 2:
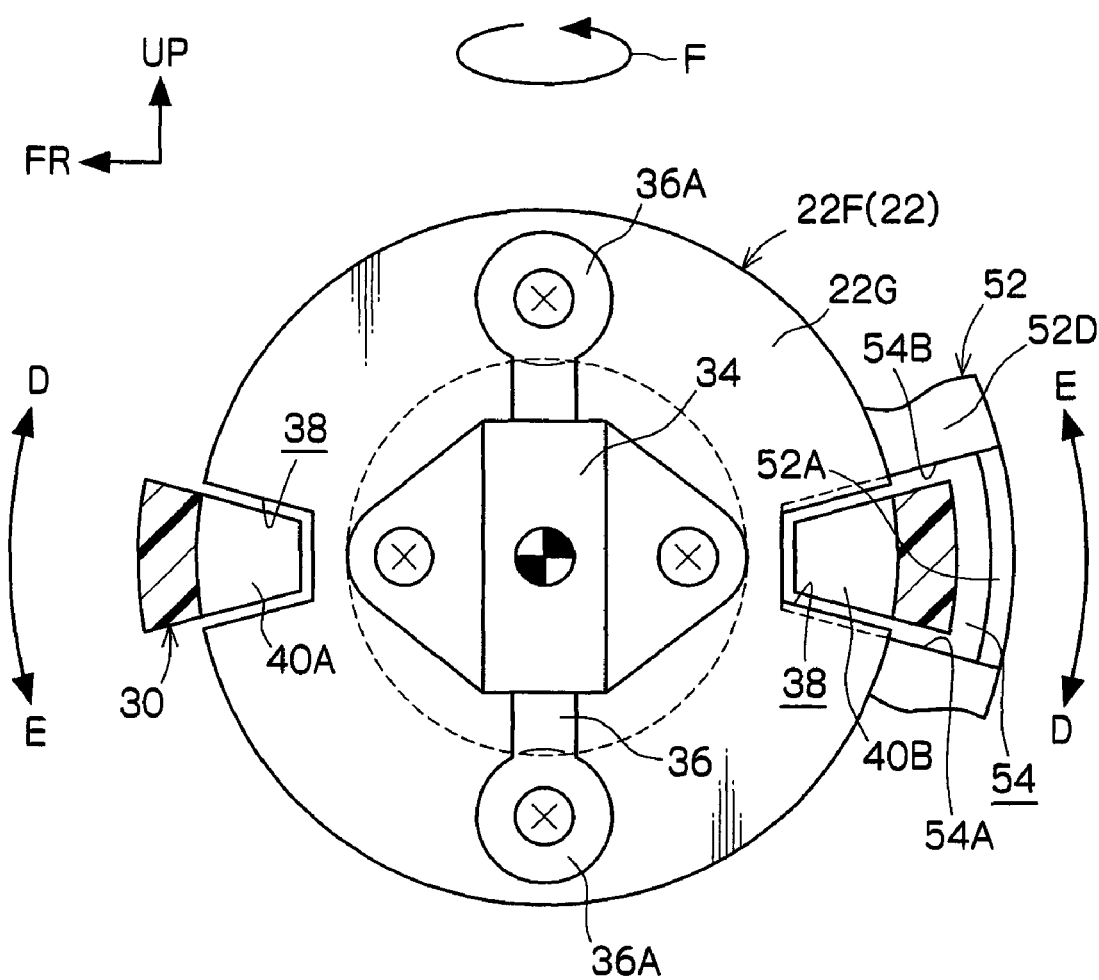
FIG. 2 is a partial cutaway side view of an operation force imparting unit of a vehicle seat according to the first exemplary embodiment of the present invention.
Figure 3:
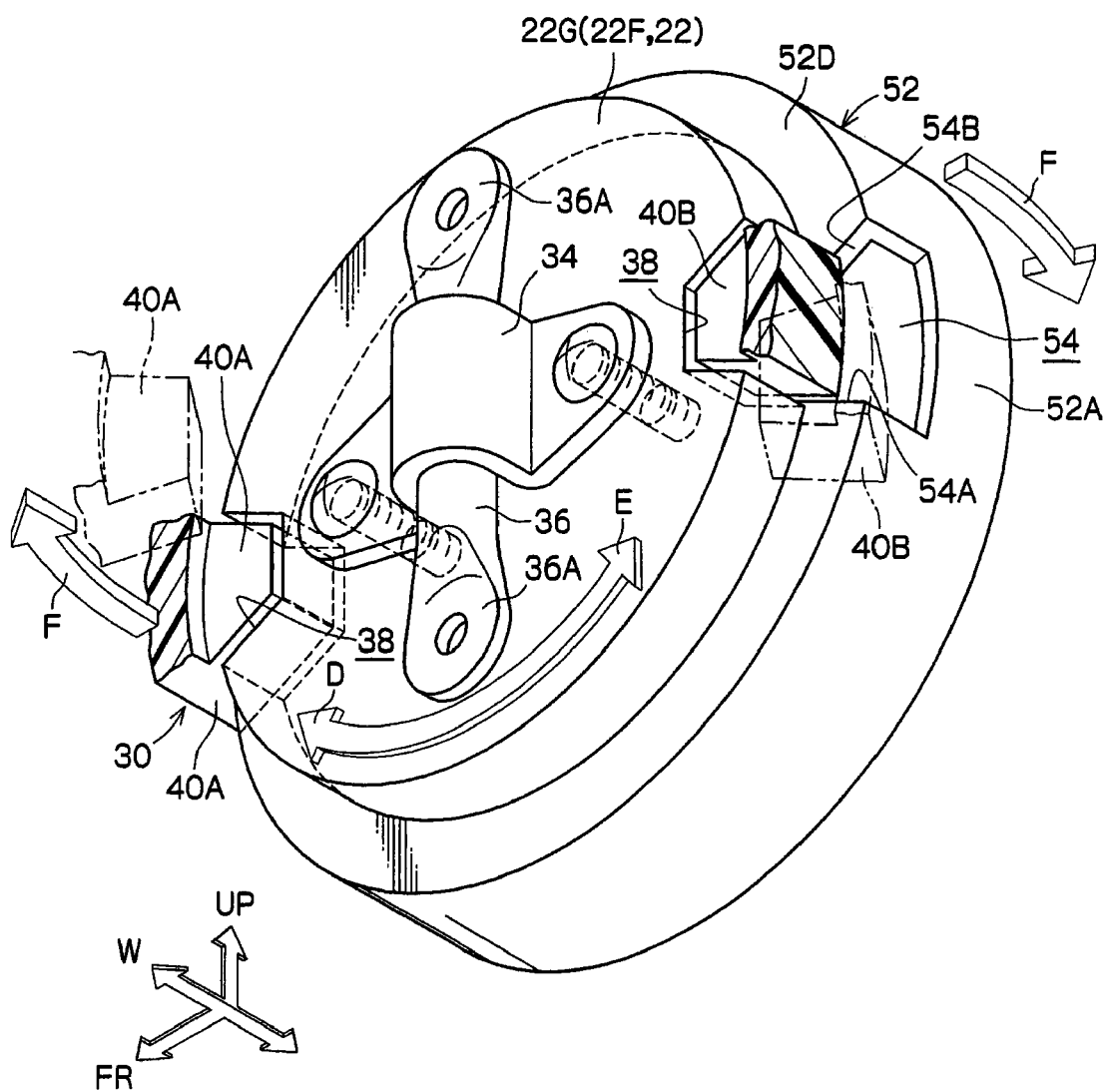
FIG. 3 is a perspective view showing an operation prevention mechanism of an operation force imparting unit of a vehicle seat according to the first exemplary embodiment of the present invention.

Furthermore, as shown in FIG. 2 and FIG. 3, there are plural engaging recesses 38 formed in the operation load input portion 22G. In the present exemplary embodiment the engaging recesses 38 are formed in two locations, front and rear, symmetrical with respect to the rotational axis of the operation load input portion 22G. There are a pair of engageable claws 40A, 40B provided protruding out from the opening of the recess portion 32 in the load transmission portion 30B. Each of the pair of engageable claws 40A, 40B are formed in a hook shape that protrudes out to the inside in the width direction along the axial direction of the recess portion 32 and that also overhangs the inside in the radial direction of the recess portion 32.

As shown by the solid lines in FIG. 3, when in the state in which the operation lever 30 is positioned in the reclining non-operation position, this pair of engageable claws 40A, 40B intrudes into the corresponding engaging recesses 38. Also, as shown by the two-dot chain lines in FIG. 3, when in the state in which the operation lever 30 is positioned in the reclining operation position, the front side engageable claw 40A is displaced to the outside in the width direction and removed from the engaging recess 38, and the rear side engageable claw 40B is displaced to the inside in the width direction and removed from the engaging recess 38.

Thereby, the operation force imparting unit 28 is configured such that, when the operation lever 30 positioned in the reclining non-operation position is rotated in a first predetermined direction of either the direction of arrow D or the direction of arrow E, the pair of engageable claws 40 engage with the engaging recesses 38, and the operation load input portion 22G rotates as one with the operation lever 30 in the direction of arrow D or the direction of arrow E. It should be noted that it may be configured such that a portion of, or all of, the operation force of the operation lever 30 in the direction of arrow D or the direction of arrow E is transmitted to the operation load input portion 22G through the reclining operation shaft 36 and the bracket 34.

The operation lever 30, as shown in FIG. 1B, is able to rotate a predetermined angle about the reclining operation shaft 36 in a second predetermined direction of the direction of arrow F, displacing the operation portion 30A toward the outside in the width direction with respect to the seat lifter 22, namely with respect to the seat cushion frame 16 supporting the 22. By this rotation, the operation lever 30 is configured so as to be able to take up the reclining non-operation position along the front-rear direction, as shown by the solid lines in FIG. 1B, and to take up the reclining operation position that is rotated by a predetermined angle in the direction of arrow F from the non-operation position, as shown by the two-dot chain lines in FIG. 1B.

The operation force imparting unit 28 is also provided with an operation force conversion member 42. The operation force conversion member 42 is supported through a non illustrated bracket by the seat cushion frame 16, so as to be able to rotate about a support shaft 44 that is along the up-down direction. The operation force conversion member 42 has an input arm 42B and an output arm 42C that are each provided so as to extend out from a support portion 42A in different radial directions, when viewed from above. In the present exemplary embodiment, the operation force conversion member 42 is formed substantially in a right angle, with the input arm 42B protruding toward the front from the support portion 42A, and the output arm 42C protruding out to the outside in the width direction from the support portion 42A.

In this operation force conversion member 42, the input arm 42B is positioned to the inside in the width direction of the engageable claw 40B of the operation lever 30 positioned in the reclining non-operation position, and by rotating the operation lever 30 toward the reclining operation position, the input arm 42B is pressed toward the inside in the width direction and rotates in the direction of arrow G. Therefore, in the operation force conversion member 42, by the rotation in the direction of arrow G, the free end side of the output arm 42C is displaced toward the front.

The operation force imparting unit 28 is configured such that operation force, of the operation lever 30 from the reclining non-operation position to the reclining operation position, is transmitted to the reclining mechanism 20 through the operation force conversion member 42 and through the covered cable 46. Specifically, the covered cable 46 is configured with a cable 46A, and a cover 46B covering the cable 46A.

One end of the cover 46B is fixed to a cable fixing bracket 48 that has been fixed to the seat cushion frame 16 in the vicinity of the reclining mechanism 20, and the other end thereof is fixed to a cable fixing bracket 50 that has been fixed to the seat cushion frame 16 in the vicinity of the operation force conversion member 42 (operation lever 30). Both ends of the cable 46A protrude out from the cover 46B, and one end thereof is anchored to the free end side of the lock release arm 20F, and the other end is anchored to the free end side of the output arm 42C of the operation force conversion member 42.

By the above, in the operation force imparting unit 28, the biasing force of the torsion spring 20E is transmitted to the operation force conversion member 42 through the cable 46A, and by the input arm 42B pressing the engageable claw 40B to the outside in the width direction, the operation lever 30 is held (biased) to the reclining non-operation position. However, in the operation force imparting unit 28, when the operation lever 30 is operated from the reclining non-operation position to the reclining operation position, the operation force conversion member 42 rotates in the direction of arrow G, and the cable 46A is pulled, and the lock release arm 20F rotates in the direction of arrow A due to the displacement of the cable 46A.

Also, as shown in FIG. 1B, there is a cover member 52 disposed in the operation force imparting unit 28 between the seat cushion frame 16 and the operation lever 30, the cover member 52 covering a portion of the pump lifter mechanism 22F (a portion excluding the operation load input portion 22G) that is positioned to the outside in the width direction of the seat cushion frame 16. The cover member 52 is, for example, embedded into the inside of cushioning material and surface covering material making up the seat cushion 12, and protects the pump lifter mechanism 22F.

The cover member 52 includes: a cover body 52A, shaped as a short circular cylinder and covering the outside in the radial direction of the pump lifter mechanism 22F; a fixed flange 52B, that is fixed to the seat cushion frame 16 so as to project out to the outside in the radial direction from the seat width direction inside of the cover body 52A; and a cover flange 52D, that projects out to the inside in the radial direction from the seat width direction outside of the cover body 52A, and constrains the operation load input portion 22G with the edge portion of a through hole 52C that pierces through the cover flange 52D.

There is a cutout portion 54 formed in the short circular cylinder shape cover body 52A and in the cover flange 52D, which are the walls forming a circular cylinder shape, and the cutout portion 54 corresponds to the engageable claw 40B of the operation lever 30 when the operation lever 30 is positioned in the reclining non-operation position, and, accompanying operation of the operation lever 30 toward the reclining operation position, the engageable claw 40B is intruded into the cutout portion 54, and displacement of the operation lever 30 to the reclining operation position is permitted. This cutout portion 54 also enables the progression and retreat of the input arm 42B of the operation force conversion member 42.

The edge portions of the cutout portion 54 in the circumferential direction of the cover body 52A are wall faces 54A, 54B. These wall faces 54A, 54B prevent rotation of the engageable claw 40B that has been intruded into the cutout portion 54, namely prevent rotation in the direction of arrow D or direction of arrow E of the operation lever 30 that is positioned in the reclining operation position.

By the above, the operation force imparting unit 28 is configured such that in the state in which the operation lever 30 is positioned in the reclining operation position, the operation lever 30 is prevented from being operated in the direction of arrow D or the direction of arrow E. Thereby, lifter operation is prevented in the state in which the operation lever 30 is positioned in the reclining operation position (including in intermediate positions between the reclining non-operation position and the reclining operation position), and the pair of engageable claws 40A, 40B are prevented from becoming misaligned with respect to the engaging recesses 38.

Furthermore, in the operation force imparting unit 28 it is configured such that in the state in which the operation lever 30 is operated in the direction of arrow D (the upper operation position side) or the direction of arrow E (the lower operation position side), by the engageable claw 40B being misaligned to the cutout portion 54 in the circumferential direction, displacement toward the inside in the seat width direction of the engageable claw 40B, namely reclining operation of the operation lever 30, is prevented by the cover body 52A and the cover flange 52D.

In the explanation above, the cover member 52 corresponds to the first and second double operation prevention mechanism, and the cover body 52A and cover flange 52D correspond to the wall portion extending in a first direction (the circumferential direction of the cover member 52) and a second direction (the height direction of the cover body 52A, thickness direction of the cover flange 52D).

Explanation will now be given of the operation of the first exemplary embodiment.

In the vehicle seat 10 configured as described above, when a seat occupant is adjusting the height of the vehicle seat 10 in the direction to increase the seating height of a seat occupant, the seat occupant places their fingers around the operation portion 30A of the operation lever 30, or grips the operation portion 30A, and the seat occupant swings (a reciprocating rotation) the operation lever 30 between the neutral position and the upper operation position. Within the operations of the operation lever 30, the operation force that accompanies movement toward the upper operation position from the neutral position, is transmitted to the seat lifter 22, and the seat cushion 12, namely the vehicle seat 10, is displaced overall upward. When operation of the operation lever 30 is stopped at the desired height, the height of the seat cushion 12 is maintained at the adjusted height by the seat lifter 22.

In a similar manner, when a seat occupant is adjusting the direction to decrease the seating height of a seat occupant, the seat occupant, for example, pushes the operation portion 30A of the operation lever 30 with the palm of their hand, or grips the operation portion 30A, and the seat occupant swings (reciprocating rotation) the operation lever 30 between the neutral position and the lower operation position. Within the operations of the operation lever 30, the operation force that accompanies movement toward the lower operation position from the neutral position is transmitted to the seat lifter 22, and the seat cushion 12, namely the vehicle seat 10, is displaced overall downward. When operation of the operation lever 30 is stopped at the desired height, the height of the seat cushion 12 is maintained at the adjusted height by the seat lifter 22.

On the other hand, when a seat occupant is adjusting the angle of the seat back 14 with respect to the seat cushion 12, the seat occupant puts their fingers around the operation portion 30A of the operation lever 30, or grips the operation portion 30A, and pushes out (pulls out) the operation portion 30A to the outside in the width direction, operating the operation lever 30 from the reclining non-operation position to the reclining operation position. That is to say, by the rotation of the operation force conversion member 42 in the direction of arrow G, relative displacement of the cable 46A with respect to the cover 46B rotates the lock release arm 20F toward the arrow A side direction, and releases the lock of the reclining mechanism 20. The seat occupant places their body weight against the seat back 14, tilts the seat back 14 backward, and stops at the desired position, or stops the seat back 14, which is swinging up with the biasing force of the return spring, at the desired position. When the seat occupant releases the operation force from the operation lever 30, the reclining mechanism 20 returns to the locked state by the biasing force of the torsion spring 20E, and the operation lever 30 returns to the non-operation position.

In the vehicle seat 10, since both the reclining mechanism 20 and the seat lifter 22 can be operated independently (selectively) according to the operation direction of the single operation lever 30, the operation lever 30 is disposed in a position with good operability for a seat occupant, and by doing so the operability of both the reclining mechanism 20 and the seat lifter 22 may be realized.

Figure 10:
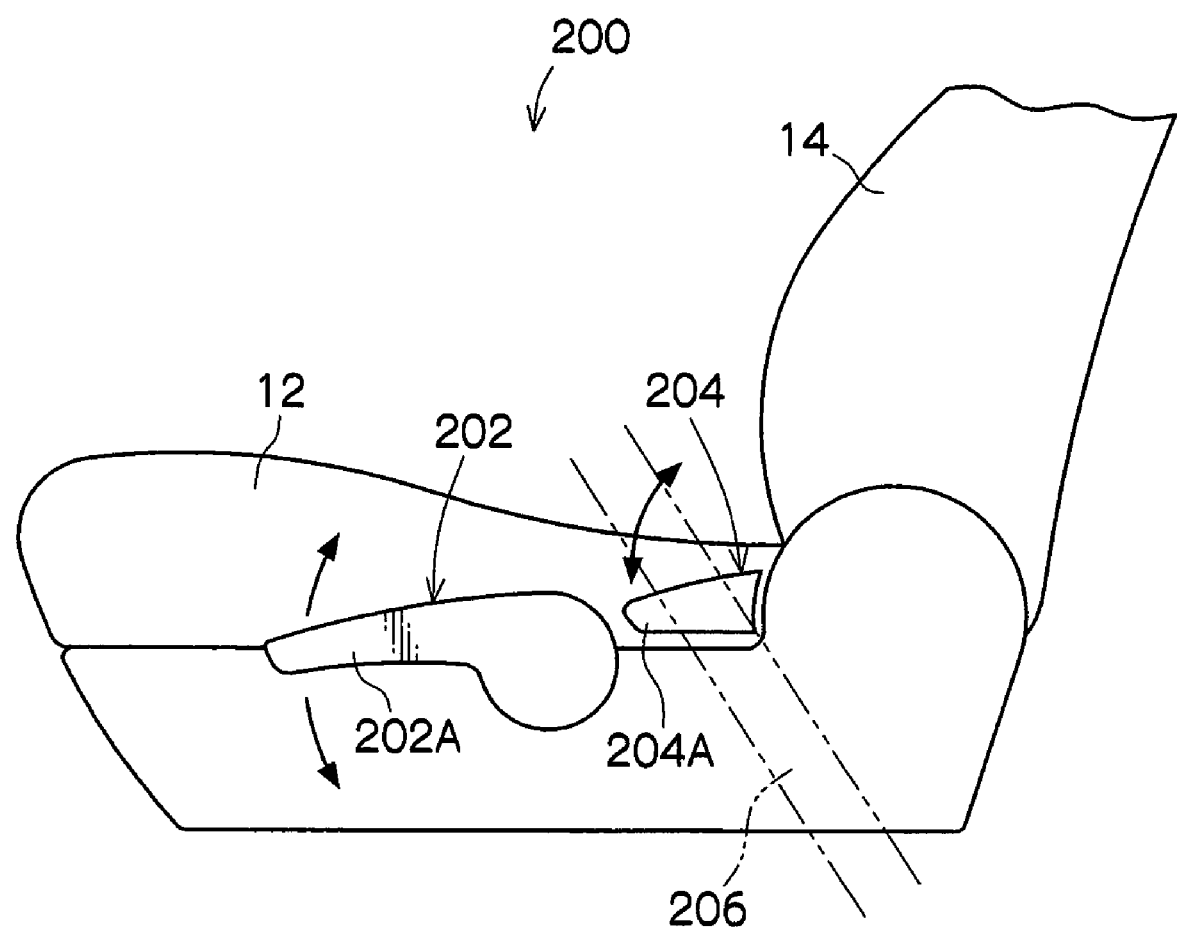
FIG. 10 is a side view showing a seat according to a comparative example to that of a vehicle seat according to an exemplary embodiment of the present invention.

Regarding this point, comparing such a configuration with that of a comparative example of FIG. 10, in a vehicle seat 200 according to a comparative example, operating portions 202A, 204A operated by a seat occupant are disposed a large distance apart in order for a lifter knob 202 for seat height adjustment and a reclining lever 204 for reclining lock release to be operated independently from each other. Due to this, the necessary minimum dimensions and space for independent operation must be secured for each of the lifter knob 202 and the reclining lever 204, and there are many restrictions on the dimensions, shape and arrangement thereof. Specifically, in the vehicle seat 200, only one of the operating portions 202A, 204A can be placed in a position that has good operability for a seat occupant, and in the comparative example, since the position of the reclining lever 204 is at a rear portion of the seat, it is not easily reached, and there is a worry that the seatbelt device 206 (buckle anchor portion) might get in the way of a hand when operating. Furthermore, the arm length (front-rear length) of both the lifter knob 202 and the reclining lever 204 are restricted to being short, and so there is a limit to the reduction that may be made to the operation force. Also, since precedence is given to securing the functionality of each of the lifter knob 202 and the reclining lever 204 within the above described limited space, there is little degree of freedom for decoration and design in the vehicle seat 200.

In this manner, in a vehicle seat, there is a limited range that provides good operability for a seat occupant, but with the vehicle seat 10, since the operation lever 30 is made common for the reclining mechanism 20 and the seat lifter 22, the limitations to the arrangement and size of the operation lever 30 are reduced, and an increase in the degrees of freedom for design is achieved. Specifically, the single operation lever 30 may be disposed in a suitable position that avoids interference with a seat belt device of the like and that is easily reached, with the operability of the reclining mechanism 20 and the seat lifter 22 secured and improved. Furthermore, since there is a high degree of freedom for setting the arm length in the operation lever 30, the operation force and the operation stroke may be appropriately set.

Since in the vehicle seat 10, the operation direction of the operation lever 30 (operation portion 30A) is also in the up-down direction (direction of arrow D, E), and toward the seat outside in the width direction (direction of arrow F), operation by a seat occupant of the reclining adjustment and of the seat height adjustment may be carried out in easy-to-operate (easy to impart operation force) directions. Furthermore, since the operation space of the operation lever 30 (the space taken up by the operation thereof) is set to the seat outside, there are fewer limitations for the positioning of the operation lever 30 (in particular arrangement limitations). In the vehicle seat 10, by supporting the load transmission portion 30B so as to be rotatable both about the rotational axis of the pump lifter mechanism 22F and about the reclining operation shaft 36, the operation direction may be set in the above described direction realizing good operability.

Also, in the vehicle seat 10, in the state in which the operation portion 30A of the operation lever 30 is moved up or down and the seat lifter 22 is operated, since the engageable claw 40B of the operation lever 30 and the input arm 42B of the operation force conversion member 42 relatively displace, or in other words, since the operation force transmission path is disconnected, even if it was to be supposed that the operation lever 30 was operated in the direction of arrow F, operation of the reclining mechanism 20 is prevented. However, in the state in which the operation portion 30A of the operation lever 30 is moved in the up or down direction and the seat lifter 22 is operated, the engageable claw 40B of the operation lever 30 interferes with the cover member 52, and therefore operation of the operation lever 30 in the direction of arrow F itself may be prevented. Thereby, the engageable claw 40B and the input arm 42B may be prevented from interfering with the rotation direction of the operation lever 30.

In contrast, in the vehicle seat 10, when the operation portion 30A of the operation lever 30 is operated toward the outside in the width direction, in the state in which the lock of the reclining mechanism 20 is released, since the engageable claw 40B is intruded into the cutout portion 54 of the cover member 52, operation of the operation lever 30 in the direction of arrow D or direction of arrow E itself is prevented. Thereby, interference in the width direction of the pair of engageable claws 40A, 40B, and operation load input portion 22G may be prevented, that is to say the pair of engageable claws 40A, 40B becoming unable to return to within the engaging recesses 38, may be prevented.

Thereby, as explained above, in the vehicle seat 10, since one or other of the reclining mechanism 20 and the seat lifter 22 may be prevented from operating while the other is being operated, unintended operation by a seat occupant (vehicle occupant) may be prevented.

Second Exemplary Embodiment

Figure 8A:
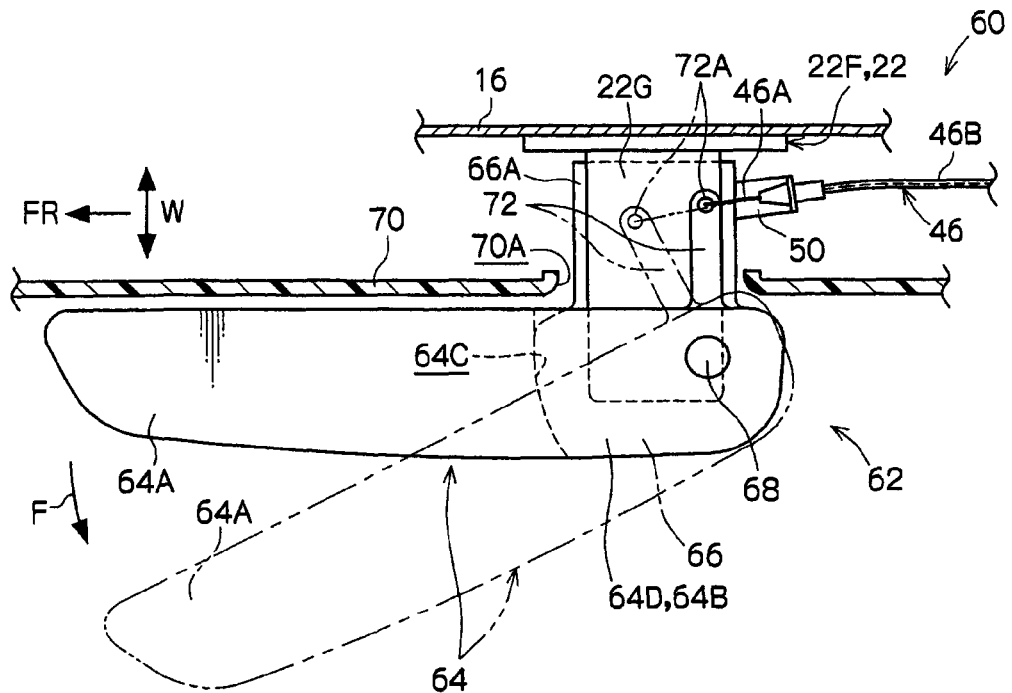
FIG. 8A is a partial cutaway bottom view showing an operation force imparting unit of a vehicle seat according to the second exemplary embodiment of the present invention.

Explanation will now be given of a vehicle seat 60 according to a second exemplary embodiment of the present invention, with reference to FIG. 7 to FIG. 9. It should be noted that components and parts which are fundamentally the same as those of the above first exemplary embodiment, or previous configurations, are allocated the same reference numerals as those of the above first exemplary embodiment, or previous configurations, and explanation thereof is sometimes omitted. Also, while the pump lifter mechanism 22F shown in FIG. 8A is of a different form to that of the pump lifter mechanism 22F of FIG. 1B, the function thereof is the same.

Figure 8B:
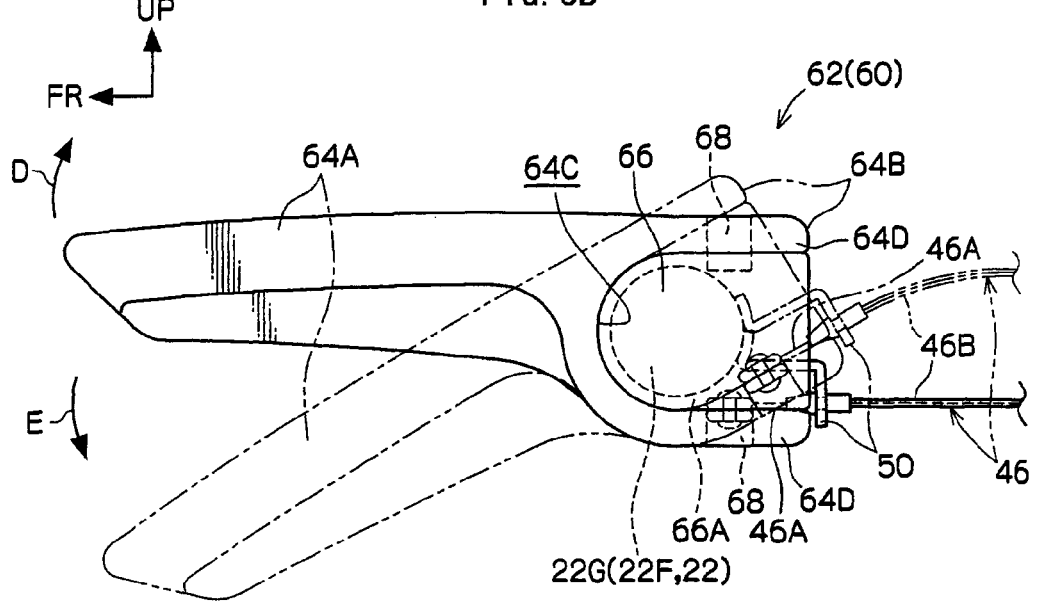
FIG. 8B is a side view showing an operation force imparting unit of a vehicle seat according to the second exemplary embodiment of the present invention.
Figure 9:
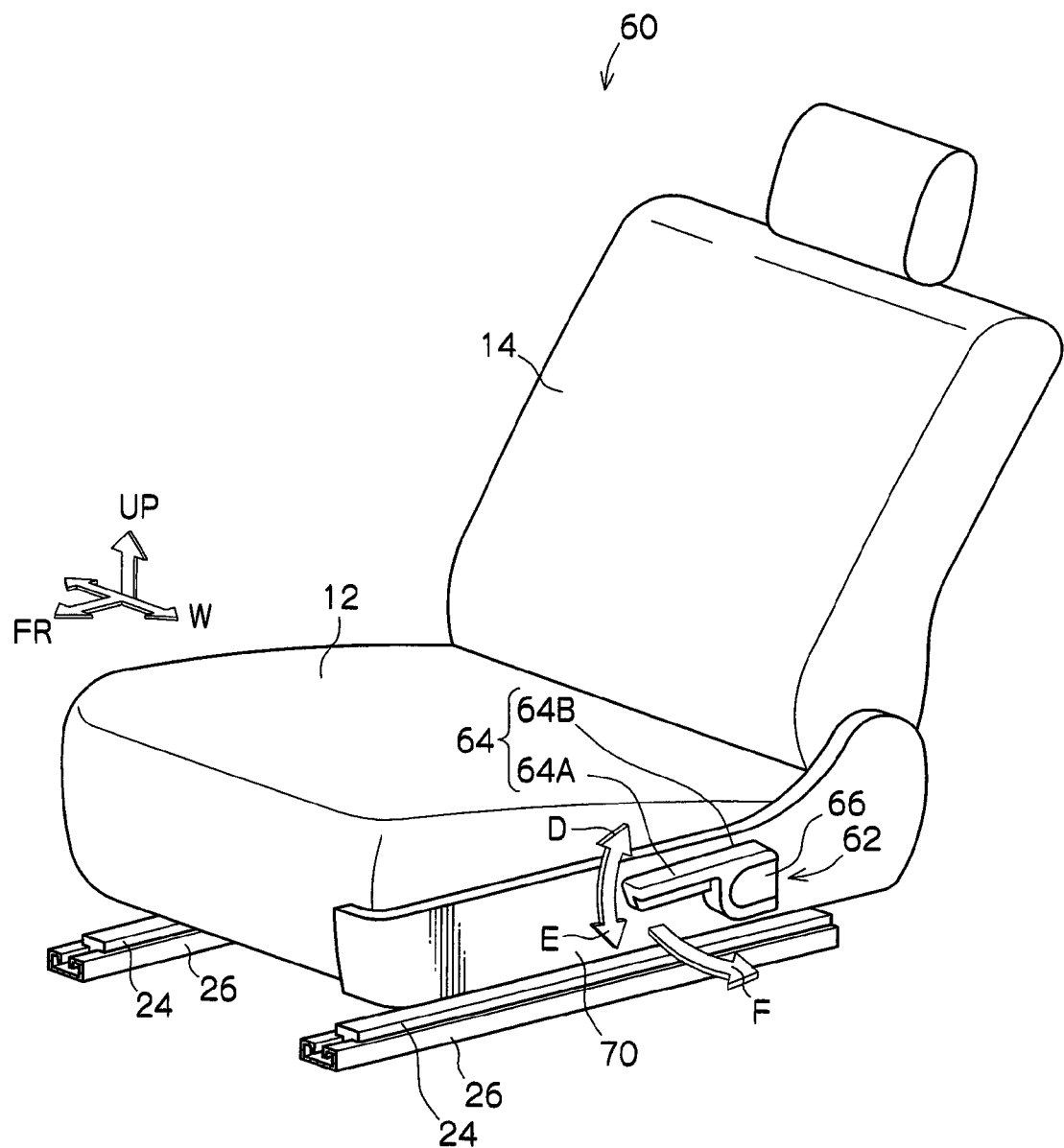
FIG. 9 is a perspective view showing the overall configuration of a vehicle seat according to the second exemplary embodiment of the present invention.

In FIG. 9 is shown a perspective view of the outline overall configuration of the vehicle seat 60, and in FIG. 7 is shown a perspective view of an operation force imparting unit 62 configuring the vehicle seat 60. Also, in FIG. 8A, a partially cutaway bottom view of the operation force imparting unit 62 is shown, and in FIG. 8B a side view of the operation force imparting unit 62 is shown. As shown in these figures, the operation force imparting unit 62 is provided with an operation lever 64 in place of the operation lever 30.

The operation lever 64 is provided with an operation portion 64A to the front end side thereof, and a load transmission portion 64B at the rear end side thereof. The operation portion 64A is formed into a shape that is easily gripped by a person's hand. The load transmission portion 64B is provided with a cutout portion 64C that has an opening toward the rear with substantially U-shaped edge portions, when viewed from the side, formed by a pair of support lugs 64D at the top and bottom of the cutout portion 64C.

There is a joint member 66 mounted coaxially to the operation load input portion 22G of the seat lifter 22 so as to be able to rotate as one therewith, the joint member 66 being disposed within the cutout portion 64C of the operation lever 64. In the operation lever 64, the pair of support lugs 64D is supported through support pins 68 that are provided coaxially to each other with axes along the up-down direction, so that the operation lever 64 is able to rotate about the support pins 68 relative to the joint member 66. The front edge portion of the cutout portion 64C of the operation lever 64 and the front edge portion of the joint member 66 are formed into a circular arc, in plan view, so that they do not interfere with each other during rotation of the operation lever 64 in the direction of arrow F.

By the above, the operation lever 64 is configured so as to be able to rotate as one with the joint member 66 in the direction of arrow D or the direction of arrow E about the axis of the pump lifter mechanism 22F, and also rotate with respect to the joint member 66 in the direction of arrow F. Therefore, the operation lever 64 may operate the seat lifter 22 in exactly the same manner as the operation lever 30.

Before explaining the structure for adjusting the reclining mechanism 20 by the operation lever 64 it should be noted that, as shown in FIG. 8A, the operation lever 64 is provided disposed to the outside in the width direction of a cover member 70 coving the outside in the width direction of the seat cushion frame 16 (seat cushion 12). The cover member 70 provided in place of the cover member 52 is different from the cover member 52 in that, as shown in FIG. 9, it is provided extending along substantially the whole length of the seat cushion 12 in the front-rear direction. Furthermore, the joint member 66 is provided with an protruding portion 66A that protrudes out to the inside in the width direction further than the operation lever 64, and the protruding portion 66A covers the top portion of the operation load input portion 22G from the outer circumference thereof. The operation load input portion 22G and the protruding portion 66A pass through a through hole 70A in the cover member 70.

In order to adjust the reclining mechanism 20 with the operation lever 64, there is an arm 72 provided protruding out toward the inside in the width direction from the lower side support lug 64D of the operation lever 64, as shown in FIG. 8A. The arm 72 rotates as one with the operation lever 64 in the direction of arrow F, and the free end side of the arm 72 displaces toward the front with the rotation in the direction of arrow F of the operation lever 64 from the non-operation position.

A cable anchor portion 72A is provided in the vicinity of the free end of the arm 72, and one end of the cable 46A of the covered cable 46 is anchored thereto, the other end being anchored to the lock release arm 20F. Therefore, the operation force imparting unit 62 is configured such that when the operation lever 64 is operated in the direction of arrow F, the cable 46A is pulled out, and the lock release arm 20F is rotated in the direction of arrow A, releasing the lock of the reclining mechanism 20.

As shown in FIGS. 8A and 8B, the cable fixing bracket 50 is fixed to the protruding portion 66A of the joint member 66, and when the seat lifter 22 is operated the cable fixing bracket 50 rotates as one with the operation lever 64 in the direction of arrow D or the direction of arrow E. Thereby, it is configured such that in the operation force imparting unit 62, there is no operation force acting on the reclining mechanism 20 during adjustment of the seat lifter 22 by the operation lever 64.

Other parts of the configuration of the vehicle seat 60 are the same as corresponding parts of the vehicle seat 10.

Therefore, in the vehicle seat 60 according to the second exemplary embodiment, since both the reclining mechanism 20 and the seat lifter 22 can be operated independently (selectively) according to the operation direction of the single operation lever 30, in the vehicle seat 60 too, similar operational effects may be obtained as those by similar operation of the vehicle seat 10, except for the prevention of operation of one or other of the reclining mechanism 20 or the seat lifter 22 when the other is being operated.

Also, in the vehicle seat 60, since the cable fixing bracket 50 is fixed at the joint member 66, no relative displacement occurs between the arm 72 and the cable fixing bracket 50 (the operation lever 64 end side of the cover 46B) during the operation of the operation lever 64 in the direction of arrow D or the direction of arrow E. Therefore, for example, in the same manner as if the cable fixing bracket 50 was fixed to the seat cushion frame 16, the cable 46A is not pulled out unintentionally during operation of the joint member 66 in the direction of arrow D or the direction of arrow E. That is to say, unintentional operation of the reclining mechanism 20 by a seat occupant during operation of the adjustment of the seat lifter 22 may be prevented.

It should be noted that in each of the above exemplary embodiments, examples were given in which the operation levers 30, 64 were rotatable about an axis along the seat width direction (the pump lifter mechanism 22F) and also about an axis along the up-down direction (the reclining operation shaft 36, the support pins 68), however, the present invention is not limited thereto, and, for example, the operation lever 30 and the like, may be rotatable about axis along two directions that include the front-rear direction, or, in place of the rotation as the operation direction of the operation lever 64 and the like, a straight line displacement direction may be used.

Also, in each of the above described exemplary embodiments, examples where given in which the seat lifter 22 was provided as the first adjustable unit, and the reclining mechanism 20 was provided as the second adjustable unit, however, the present invention is not limited thereto, and, for example, it may be configured with other adjustable units as the object of adjustment by operation of the operation lever 30. Examples that may be given of other adjustable units include a seat front portion tilt mechanism, for adjusting the height of the front portion of the seat cushion 12 relative to the back portion thereof, or a seat plane angle adjusting mechanism, for adjusting the seat plane angle relative to the floor.

Also, in each of the above exemplary embodiments, examples have been given of the present invention as applied to vehicle seat 10 or vehicle seat 60, however, the present invention is not limited thereto, and the present invention may be applied to various passenger seats and leisure chairs, as well as office chairs.

The invention claimed is:

1. A seat comprising:
 a first adjustable unit, provided to a seat body that is for sitting on, the first adjustable unit being adjusted by operation force transmitted from a first operating system;
 a second adjustable unit, provided to the seat body, the second adjustable unit being adjusted by operation force transmitted from a second operating system;
 an operation force imparting member for imparting operation force to the first operating system by operation in a first predetermined direction from a non-operation position and imparting operation force to the second operating system by operation in a second predetermined direction that is different from that of the first predetermined direction from the non-operation position, wherein the operation force imparting member includes at least one engaging portion; and
 a double operation prevention member configured to interact with the at least one engaging portion,
  when the operation force imparting member is operated in the first predetermined direction, to prevent operation of the operation force imparting member in the second predetermined direction, and
  when the operation force imparting member is operated in the second predetermined direction, prevent operation of the operation force imparting member in the first predetermined direction.

2. The seat according to claim 1, wherein the operation force imparting member is disposed adjacent to the seat body at the seat width direction outside, and the first predetermined direction is along the seat up-down direction, and the second predetermined direction is along the seat width direction.

3. The seat according to claim 2, wherein:
 the rear end in the front-rear direction of the operation force imparting member is supported by the seat body so as to be rotatable about an axis that is along the seat width direction and also so as to be rotatable about an axis that is along the seat up-down direction;
 the first predetermined direction is a rotational direction about an axis along the seat width direction in which the front end side of the operation force imparting member is displaced either toward the top side or toward the bottom side in the seat up-down direction; and the second predetermined direction is a rotational direction about an axis along the seat up-down direction in which the front end side of the operation force imparting member is displaced in the seat width direction.

4. The seat according to claim 1, wherein the double operation prevention member comprises a wall portion that extends along the first predetermined direction and along the second predetermined direction, and the wall portion is formed with a cutout portion into which the at least one engaging portion of the operation force imparting member is intruded accompanying the operation of the operation force imparting member in the second predetermined direction from the non-operation position.

5. The seat according to claim 1, wherein:
the first adjustable unit is a height adjusting mechanism for adjusting position of the seat body in the up-down direction; and the second adjustable unit is a reclining mechanism for switching between a state in which a seat back angle relative to a seat cushion is locked, and a lock released state thereof.

* * * * *